(12) United States Patent
Yamanishi et al.

(10) Patent No.: US 9,850,558 B2
(45) Date of Patent: Dec. 26, 2017

(54) CERMET, METHOD FOR PRODUCING CERMET, AND CUTTING TOOL

(71) Applicant: Sumitomo Electric Industries, Ltd., Osaka-shi (JP)

(72) Inventors: Takato Yamanishi, Itami (JP); Masato Michiuchi, Itami (JP); Keiichi Tsuda, Itami (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 57 days.

(21) Appl. No.: 14/897,194

(22) PCT Filed: Jan. 8, 2015

(86) PCT No.: PCT/JP2015/050302
§ 371 (c)(1),
(2) Date: Dec. 9, 2015

(87) PCT Pub. No.: WO2015/156004
PCT Pub. Date: Oct. 15, 2015

(65) Prior Publication Data
US 2016/0130688 A1    May 12, 2016

(30) Foreign Application Priority Data

Apr. 10, 2014    (JP) .................................. 2014-081458

(51) Int. Cl.
*C22C 29/16*    (2006.01)
*C22C 14/00*    (2006.01)
(Continued)

(52) U.S. Cl.
CPC ................ *C22C 29/16* (2013.01); *B22F 3/16* (2013.01); *B22F 9/04* (2013.01); *C04B 35/5611* (2013.01);
(Continued)

(58) Field of Classification Search
USPC .......... 51/307, 309; 428/325, 457, 469, 472, 428/698; 419/13, 14, 38; 75/236, 238, 75/241, 242
See application file for complete search history.

(56) References Cited

U.S. PATENT DOCUMENTS 3,752,655 A    8/1973    Ramqvist
5,308,376 A *  5/1994    Oskarsson ............. C22C 29/04
                                                         75/241

(Continued)

FOREIGN PATENT DOCUMENTS

CN    1093121 A    10/1994
CN    1362309 A    8/2002
(Continued)

OTHER PUBLICATIONS

Notification of the First Office Action in Chinese Patent Application No. 201580000990.1, dated Aug. 2, 2016.
(Continued)

*Primary Examiner* — Archene Turner
(74) *Attorney, Agent, or Firm* — Venable LLP; Michael A. Sartori; Laura G. Remus

(57) ABSTRACT

A cermet contains hard phase particles containing Ti and a binding phase containing at least one of Ni and Co, and 70% or more (by number) of the hard phase particles have a cored structure containing a core and a peripheral portion around the core. The core is composed mainly of at least one of Ti carbide, Ti nitride, and Ti carbonitride, and the peripheral portion is composed mainly of a Ti composite compound containing Ti and at least one selected from W, Mo, Ta, Nb, and Cr. The core has an average particle size α, the peripheral portion has an average particle size β, and α and β satisfy $1.1 \leq \beta/\alpha \leq 1.7$.

6 Claims, 1 Drawing Sheet

(51) Int. Cl.

| | |
|---|---|
| *B22F 3/16* | (2006.01) |
| *B22F 9/04* | (2006.01) |
| *C22C 29/02* | (2006.01) |
| *C22C 1/10* | (2006.01) |
| *C04B 35/56* | (2006.01) |
| *C04B 35/58* | (2006.01) |
| *C04B 35/626* | (2006.01) |
| *C04B 35/628* | (2006.01) |
| *C22C 29/04* | (2006.01) |
| *C22C 29/10* | (2006.01) |
| *B22F 5/00* | (2006.01) |

(52) U.S. Cl.
 CPC .. *C04B 35/58014* (2013.01); *C04B 35/58021* (2013.01); *C04B 35/62615* (2013.01); *C04B 35/62831* (2013.01); *C04B 35/62897* (2013.01); *C22C 1/1084* (2013.01); *C22C 14/00* (2013.01); *C22C 29/02* (2013.01); *C22C 29/04* (2013.01); *C22C 29/10* (2013.01); *B22F 2005/001* (2013.01); *B22F 2009/041* (2013.01); *B22F 2301/20* (2013.01); *B22F 2301/205* (2013.01); *B22F 2302/10* (2013.01); *B22F 2302/15* (2013.01); *B22F 2302/20* (2013.01); *B22F 2304/05* (2013.01); *B22F 2998/10* (2013.01); *C04B 2235/3839* (2013.01); *C04B 2235/3843* (2013.01); *C04B 2235/3847* (2013.01); *C04B 2235/3856* (2013.01); *C04B 2235/3886* (2013.01); *C04B 2235/5445* (2013.01); *C04B 2235/65* (2013.01)

(56) References Cited

U.S. PATENT DOCUMENTS

| | | | |
|---|---|---|---|
| 5,670,726 A * | 9/1997 | Kolaska | C22C 29/04 419/38 |
| 6,372,346 B1 | 4/2002 | Toth | |
| 6,387,552 B1 * | 5/2002 | Iyori | C22C 29/04 428/325 |
| 6,824,601 B2 * | 11/2004 | Yamamoto | C23C 14/0641 428/698 |
| 7,217,390 B2 | 5/2007 | Shim et al. | |
| 2005/0275143 A1 | 12/2005 | Toth | |
| 2006/0048603 A1 | 3/2006 | Sundin et al. | |

FOREIGN PATENT DOCUMENTS

| | | |
|---|---|---|
| EP | 0 591 121 A1 | 4/1994 |
| EP | 1 087 026 A1 | 3/2001 |
| EP | 2 564 958 A1 | 3/2013 |
| JP | 06-172913 A | 6/1994 |
| JP | 2001-158932 A | 6/2001 |
| JP | 2004-292842 A | 10/2004 |
| JP | 2005-200668 A | 7/2005 |
| JP | 2005-213599 * | 8/2005 |
| JP | 2006-509908 A | 3/2006 |
| JP | 2006-131975 A | 5/2006 |
| JP | 2007-111786 A | 5/2007 |
| JP | 2009-019276 A | 1/2009 |
| JP | 2010-031308 A | 2/2010 |
| WO | WO-2004/053178 A1 | 6/2004 |

OTHER PUBLICATIONS

International Search Report in PCT International Application No. PCT/JP2015/050302, dated Feb. 17, 2015.

Bin Zhan, et al., "Effect of VC/Cr3C2 on microstructure and mechanical properties of Ti(C,N)-based cermets", Transactions of Nonferrous Metals Society of China, vol. 22, No. 5, pp. 1096-1105 (2012). [Cited in EESR in corresponding EP Patent Application No. 15776168.5, dated May 2, 2017].

* cited by examiner

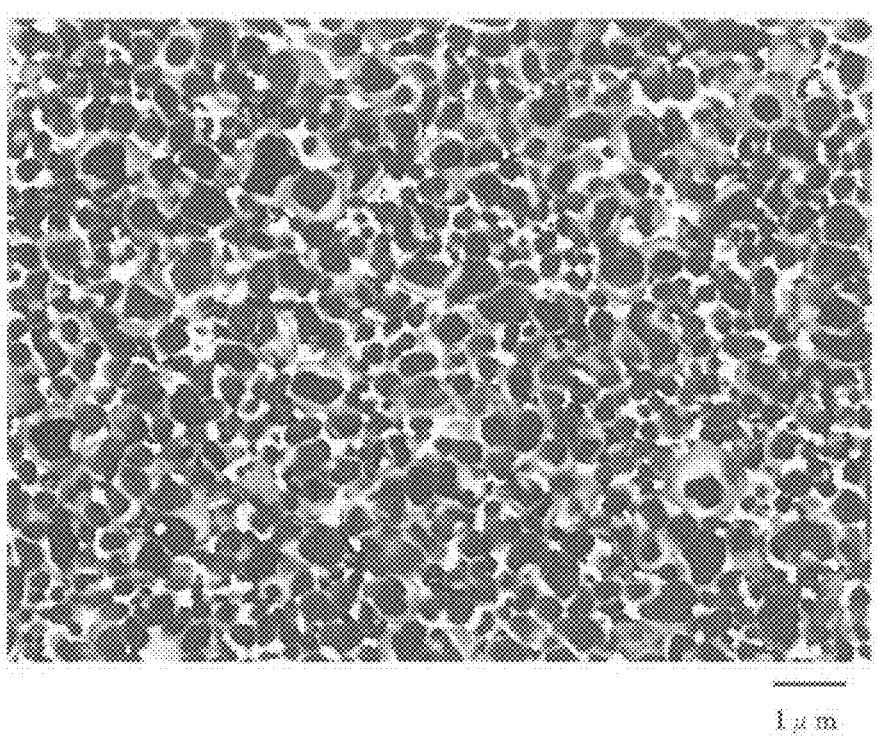

CERMET, METHOD FOR PRODUCING CERMET, AND CUTTING TOOL

TECHNICAL FIELD

The present invention relates to a cermet that contains hard phase particles containing at least Ti and a binding phase containing at least one of Ni and Co, a method for producing the cermet, and a cutting tool containing the cermet.

BACKGROUND ART

Hard materials called cermets have been utilized in main bodies (substrates) of cutting tools. Cermets are sintered bodies in which hard phase particles are bonded together with an iron group metal binding phase, and are hard materials in which a Ti compound, such as titanium carbide (TiC), titanium nitride (TiN), or titanium carbonitride (TiCN), is used as hard phase particles. As compared with cemented carbide in which tungsten carbide (WC) is used in main hard phase particles, cermets have advantages, such as [1] a reduction in the amount of scarce resource W used, [2] high wear resistance, [3] a finely machined surface in steel cutting, and [4] light weight. On the other hand, cermets have problems in that they have lower strength and toughness than cemented carbide, are susceptible to thermal shock, and therefore have limited processing applications.

Hard phase particles in some cermets have a cored structure composed of a core and a peripheral portion around the core. The core is rich in TiC or TiCN, and the peripheral portion is rich in a Ti composite compound that contains Ti and another metal (such as periodic table IV, V, and/or VI group element(s)). The peripheral portion improves wettability between the hard phase particles and a binding phase, imparts good sinterability to the cermets, and thereby contributes to improved strength and toughness of the cermets. Attempts have been made to further improve the strength and toughness of cermets, for example, by controlling the composition of such a cored structure (see, for example, Patent Literature 1 to Patent Literature 4).

CITATION LIST

Patent Literature

PTL 1: Japanese Unexamined Patent Application Publication No. 06-172913
PTL 2: Japanese Unexamined Patent Application Publication No. 2007-111786
PTL 3: Japanese Unexamined Patent Application Publication No. 2009-19276
PTL 4: Japanese Unexamined Patent Application Publication No. 2010-31308

SUMMARY OF INVENTION

Technical Problem

Even though some existing cermets have improved strength and toughness, they might not have sufficient strength and toughness for certain applications. In particular, when a cutting tool containing an existing cermet is used for cutting at a cutting speed of 100 m/min or more or for interrupted cutting, heat tends to accumulate in a cutting edge of the cutting tool and its vicinity, often resulting in flank wear, face wear (crater wear), heat check, and fractures resulting therefrom.

In view of the situations described above, it is an object of the present invention to provide a cermet that can constitute heat-resistant cutting tools and a method for producing the cermet. It is another object of the present invention to provide a heat-resistant cutting tool.

Solution to Problem

The reason that heat tends to accumulate in a cutting edge of an existing cermet and its vicinity during cutting is probably that heat of the cutting edge cannot dissipate through the interior of the cutting tool. Thus, the present inventors studied the thermal properties of cermets and found that a Ti composite compound in a peripheral portion of hard phase particles having a cored structure has a solid solution structure, and therefore the peripheral portion has lower thermal conductivity than the core composed of TiC or TiN. Although the peripheral portion contributes to improved sinterability of cermets, it was found that an excessive peripheral portion in a cermet significantly decreases the thermal conductivity of the cermet and reduces the heat resistance of the cermet. On the basis of these findings, a cermet according to one aspect of the present invention and a method for producing a cermet according to one aspect of the present invention are defined as described below.

A cermet according to one aspect of the present invention is a cermet that contains hard phase particles containing Ti and a binding phase containing at least one of Ni and Co, and 70% or more (by number) of the hard phase particles have a cored structure containing a core and a peripheral portion around the core. The core of the hard phase particles having the cored structure is composed mainly of at least one of Ti carbide, Ti nitride, and Ti carbonitride. The peripheral portion of the hard phase particles having the cored structure is composed mainly of a Ti composite compound containing Ti and at least one selected from W, Mo, Ta, Nb, and Cr. In a cermet according to one aspect of the present invention, the core has an average particle size $\alpha$, the peripheral portion has an average particle size $\beta$, and $\alpha$ and $\beta$ satisfy $1.1 \leq \beta/\alpha \leq 1.7$.

A method for producing a cermet according to one aspect of the present invention includes a preparing step, a mixing step, a shaping step, and a sintering step, as described below.

Preparing step: Preparing of a first hard phase raw powder containing at least one of Ti carbide, Ti nitride, and Ti carbonitride, a second hard phase raw powder containing at least one selected from W, Mo, Ta, Nb, and Cr, and a binding phase raw powder containing at least one of Co and Ni.

Mixing step: Mixing of the first hard phase raw powder, the second hard phase raw powder, and the binding phase raw powder in an attritor. In the mixing step, the attritor has a peripheral speed in the range of 100 to 400 m/min, and the mixing time ranges from 0.1 to 5 hours.

Shaping step: Shaping of mixed raw materials prepared in the mixing step.

Sintering step: Sintering of a shaped body produced in the shaping step.

Advantageous Effects of Invention

A cermet according to the present invention has high heat resistance. A heat-resistant cermet according to the present invention can be produced by a method for producing a cermet according to the present invention.

BRIEF DESCRIPTION OF DRAWINGS

FIG. 1 is a scanning electron microscope photograph of a cermet according to an embodiment of the present invention.

DESCRIPTION OF EMBODIMENTS

Description of Embodiments of Present Invention

First, the embodiments of the present invention will be described below.

<1> A cermet according to an embodiment of the present invention is a cermet that contains hard phase particles containing Ti and a binding phase containing at least one of Ni and Co, and 70% or more (by number) of the hard phase particles have a cored structure containing a core and a peripheral portion around the core. The core of the hard phase particles having the cored structure is composed mainly of at least one of Ti carbide, Ti nitride, and Ti carbonitride. The peripheral portion of the hard phase particles having the cored structure is composed mainly of a Ti composite compound containing Ti and at least one selected from W, Mo, Ta, Nb, and Cr. The core has an average particle size α, the peripheral portion has an average particle size (that is, the hard phase particles having the cored structure have an average particle size) β, and α and β satisfy $1.1 \leq \beta/\alpha \leq 1.7$.

The hard phase particles having the cored structure that satisfy the formula have a thin peripheral portion having low thermal conductivity and have high thermal conductivity. Thus, a cermet containing hard phase particles having such a cored structure has higher thermal conductivity than existing cermets, retains less heat, and suffers less thermal damage.

<<Hard Phase Particles>>

The hard phase particles having the cored structure constitute 70% or more of all the hard phase particles. Hard phase particles having no cored structure are hard phase particles having almost no peripheral portion, that is, Ti carbide particles, Ti nitride particles, or Ti carbonitride particles. The hard phase particles having the cored structure preferably constitute 90% or more of all the hard phase particles in order to maintain the sinterability of the cermet.

The core of the hard phase particles having the cored structure is composed mainly of at least one of Ti carbide, Ti nitride, and Ti carbonitride. That is, the core is substantially composed of the Ti compound. Thus, the Ti content of the core is 50% or more by mass.

The peripheral portion of the hard phase particles having the cored structure is composed mainly of a Ti composite compound (=a compound containing Ti and at least one selected from W, Mo, Ta, Nb, and Cr). That is, the peripheral portion is substantially composed of the Ti composite compound. Thus, the W, Mo, Ta, Nb, and Cr content of the peripheral portion is 50% or more by mass.

The average particle size α (μm) of the core and the average particle size βp (μm) of the peripheral portion in the present specification are average values of the Feret's diameter in the horizontal direction and the Feret's diameter in the vertical direction in a cross section image in the image analysis of a cross section of the cermet. More specifically, the Feret's diameter in the horizontal direction and the Feret's diameter in the vertical direction are measured in at least 200 hard phase particles having the cored structure in the cross section image. The average values of the Feret's diameters of the hard phase particles are summed up, and the total is divided by the number of measured particles. When β/α calculated in this manner ranges from 1.1 to 1.7, the peripheral portion has a sufficient thickness to improve wettability between the hard phase particles and the binding phase but is not so thick as to greatly decrease the thermal conductivity of the hard phase particles. β/α preferably ranges from 1.3 to 1.5. The average particle size β of the peripheral portion is identical with the average particle size of the hard phase particles having the cored structure.

<<Binding Phase>>

The binding phase contains at least one of Ni and Co and combines the hard phase particles. The binding phase is substantially composed of at least one of Ni and Co and may contain a component of the hard phase particles (Ti, W, Mo, Ta, Nb, Cr, C, and/or N) and inevitable components.

<<Thermal Conductivity of Cermet>>

A cermet according to an embodiment of the present invention has higher thermal conductivity than before due to an improvement in the thermal conductivity of the hard phase particles. A cermet preferably has a thermal conductivity of 20 W/m·K or more.

<2> A cermet according to an embodiment of the present invention contains hard phase particles having an average particle size of 1.0 μm or less.

When the average particle size of all the hard phase particles including the hard phase particles having the cored structure is 1.0 μm or less, the cermet has a good balance of toughness and hardness. A decrease in average particle size tends to result in low toughness, and an increase in average particle size tends to result in low hardness. The average particle size preferably ranges from 0.3 to 0.7 μm. The average particle size of all the hard phase particles can be determined in a cross section image in which the number of all the hard phase particles is 200 or more. The number of all the hard phase particles is the total of the number of the hard phase particles having the cored structure and the number of hard phase particles having no cored structure in the cross section image. The particle size of each of the hard phase particles having the cored structure and the hard phase particles having no cored structure is an average value of the Feret's diameter in the horizontal direction and the Feret's diameter in the vertical direction. The average particle size of the hard phase particles can be calculated by summing up the particle sizes of all the hard phase particles and dividing the total by the number of measured particles.

<3> A cermet according to an embodiment of the present invention has a Ti content in the range of 50% to 70% by mass, a W, Mo, Ta, Nb, and Cr content in the range of 15% to 30% by mass, and a Co and Ni content in the range of 15% to 20% by mass.

A cermet containing the predetermined amounts of the elements has a good balance of the binding phase and the core and peripheral portion of the hard phase particles having the cored structure and has high toughness and adhesion resistance. For example, when the W, Mo, Ta, Nb, and Cr content of the Ti composite compound in the peripheral portion is 15% or more by mass, the cermet has improved sinterability due to a sufficient absolute amount of the peripheral portion in the cermet. Thus, the cermet tends to have improved toughness. When the W, Mo, Ta, Nb, and Cr content is 30% or less by mass, this can suppress the increase in the number of hard phase particles having no cored structure and containing these elements (for example, WC) in the cermet and suppress the decrease in the adhesion resistance of the cermet.

<4> A method for producing a cermet according to an embodiment of the present invention includes a preparing step, a mixing step, a shaping step, and a sintering step, as described below.

Preparing step: Preparing of a first hard phase raw powder containing at least one of Ti carbide, Ti nitride, and Ti carbonitride, a second hard phase raw powder containing at least one selected from W, Mo, Ta, Nb, and Cr, and a binding phase raw powder containing at least one of Co and Ni.

Mixing step: Mixing of the first hard phase raw powder, the second hard phase raw powder, and the binding phase raw powder in an attritor. In the mixing step, the attritor has a peripheral speed in the range of 100 to 400 m/min, and the mixing time ranges from 0.1 to 5 hours.

Shaping step: Shaping of mixed raw materials prepared in the mixing step.

Sintering step: Sintering of a shaped body produced in the shaping step.

One of the characteristics of the method for producing a cermet according to the present embodiment is the mixing of the raw powders in the attritor at the predetermined peripheral speed for the short time. This allows the peripheral portion around the core in the hard phase particles having the cored structure to have an appropriate state. More specifically, the peripheral portion can have a sufficient thickness to improve wettability between the hard phase particles and the binding phase but is not so thick as to greatly decrease the thermal conductivity of the hard phase particles having the cored structure.

<<Preparing Step>>

In the preparing step of the production method, the first hard phase raw powder, the second hard phase raw powder, and the binding phase raw powder are prepared. The blend ratio of the raw powders is appropriately selected in accordance with the desired characteristics of the cermet. Typically, the mass ratio of the first hard phase raw powder to the second hard phase raw powder preferably ranges from 50:30 to 70:20, and the mass ratio of the hard phase raw powder to the binding phase raw powder preferably ranges from 80:20 to 90:10.

The average particle sizes of the first hard phase raw powder, the second hard phase raw powder, and the binding phase raw powder range from 0.5 to 1.0 μm, 0.5 to 2.0 μm, and 0.5 to 3.0 μm, respectively. Unlike the average particle size of the hard phase particles in the cermet, the average particle sizes of the raw powders are determined by the Fisher method. The particles of the raw powders are pulverized and deformed through the mixing step and the shaping step, as described below.

<<Mixing Step>>

In the mixing step of the production method, the first hard phase raw powder, the second hard phase raw powder, and the binding phase raw powder are mixed in the attritor. If necessary, a forming aid (for example, paraffin) may be added to the mixture.

The attritor is a mixer that includes a rotating shaft and a plurality of stirring rods protruding circumferentially from the rotating shaft. The peripheral speed (rotation speed) of the attritor ranges from 100 to 400 m/min, and the mixing time ranges from 0.1 hours (=6 minutes) to 5 hours. When the peripheral speed and the mixing time are not less than the lower limits of the specified ranges, the raw powders are sufficiently mixed, the accumulation of the binding phase or the formation of an aggregation phase in the cermet can be suppressed, and hard phase particles having the cored structure can constitute 70% or more of the cermet. When the peripheral speed and the mixing time are not more than the upper limits of the specified ranges, this can prevent the peripheral portion of the hard phase particles having the cored structure in the cermet from becoming excessively thick. The preferred conditions for mixing in the attritor include a peripheral speed in the range of 200 to 300 m/min and a mixing time in the range of 0.5 to 3 hours. The mixing in the attritor may be performed with cemented carbide ball media or without media.

<<Shaping Step>>

In the shaping step of the production method, the mixed powders (the first hard phase raw powder+the second hard phase raw powder+the binding phase raw powder+an optional forming aid) are charged and pressed in a mold. The pressing pressure preferably depends on the composition of the raw powders and preferably ranges from approximately 50 to 250 MPa, more preferably 90 to 110 MPa.

<<Sintering Step>>

In the sintering step of the production method, sintering is preferably performed stepwise. For example, sintering has a forming aid removal period, a first heating period, a second heating period, a holding period, and a cooling period. The forming aid removal period refers to a period during which the temperature is increased to the volatilization temperature of the forming aid, for example, 350° C. to 500° C. During the next first heating period, the shaped body is heated to a temperature in the range of approximately 1200° C. to 1300° C. under vacuum. During the next second heating period, the shaped body is heated to a temperature in the range of approximately 1300° C. to 1600° C. in a nitrogen atmosphere at a pressure in the range of 0.4 to 3.3 kPa. During the holding period, the shaped body is held at the final temperature of the second heating period for 1 to 2 hours. During the cooling period, the shaped body is cooled to room temperature in a nitrogen atmosphere.

<5> A cutting tool according to an embodiment of the present invention is a cutting tool that contains a cermet according to an embodiment of the present invention as a substrate.

A cermet according to an embodiment of the present invention has high heat resistance and a good balance of toughness and hardness and is suitable for substrates of cutting tools. The cutting tools may be of any type, for example, indexable inserts, drills, or reamers.

<6> In a cutting tool according to an embodiment of the present invention, at least part of a surface of the substrate is covered with a hard film.

The hard film preferably covers a portion of the substrate that is to become a cutting edge and a vicinity of the portion or may cover the entire surface of the substrate. The formation of the hard film on the substrate can improve wear resistance while the toughness of the substrate is maintained. The formation of the hard film on the substrate can increase the chipping resistance of the cutting edge of the substrate and improve the machined surface state of workpieces.

The hard film may be monolayer or multilayer and preferably has a thickness in the range of 1 to 20 μmin total.

The composition of the hard film may be a carbide, nitride, oxide, or boride of one or more elements selected from periodic table IV, V, and VI metals, aluminum (Al), and silicon (Si), or a solid solution thereof, for example, Ti(C, N), $Al_2O_3$, (Ti, Al)N, TiN, TiC, or (Al, Cr)N. Cubic boron nitride (cBN) and diamond-like carbon are also suitable for the composition of the hard film. The hard film can be formed by a gas phase method, such as a chemical vapor deposition method or a physical vapor deposition method.

Details of Embodiments of Present Invention

A cermet according to an embodiment of the present invention and a method for producing the cermet will be described below. The present invention is defined by the appended claims rather than by these embodiments. All modifications that fall within the scope of the claims and the equivalents thereof are intended to be embraced by the claims.

TEST EXAMPLE 1

A cutting tool containing a cermet was practically produced, and the composition and structure of the cermet and the cutting performance of the cutting tool were examined.
<Production of Samples 1 to 13>
A sample was produced by a sequence of preparing step→mixing step→shaping step→sintering step. These steps will be described in detail below. Among these steps, the mixing step is one of features.
<<Preparing Step>>
A TiCN powder and a TiC powder were prepared as first hard phase raw powders. A WC powder, a Mo$_2$C powder, a NbC powder, a TaC powder, and a Cr$_3$C$_2$ powder were prepared as second hard phase raw powders. A Co powder and a Ni powder were prepared as binding phase raw powders. The first hard phase raw powder, the second hard phase raw powder, and the binding phase raw powder were mixed at a mass ratio listed in Table I. The average particle size of each powder is as follows: TiCN: 0.7 μm, TiC: 1.2 μm, WC: 1.2 μm, Mo2C: 1.2 μm, NbC: 1.0 μm, TaC: 1.0 μm, Cr$_3$C$_2$: 1.4 μm, Co: 1.4 μm, and Ni: 2.6 μm. These average particle sizes were measured by the Fisher method.
<<Mixing Step>>
The raw powders blended at a mass ratio listed in Table I, a solvent ethanol, and a forming aid paraffin were mixed in an attritor to prepare a mixed raw material slurry. The paraffin constituted 2% by mass of the slurry. The conditions for mixing in the attritor included a peripheral speed of 250 m/min for 1.5 hours. The solvent was volatilized from the raw powder slurry to produce a mixed powder.
<<Shaping Step>>
The mixed powder was charged in a mold and was pressed at a pressure of 98 MPa. The shaped body had the SNG432 shape according to the ISO standard.
<<Sintering Step>>
The shaped body having the SNG432 shape was sintered. More specifically, the shaped body was first heated to 370° C. to remove the forming aid paraffin. The shaped body was then heated to 1200° C. under vacuum. The shaped body was then heated to 1520° C. in a nitrogen atmosphere at 3.3 kPa and was held at 1520° C. for 1 hour. The shaped body was then cooled to 1150° C. under vacuum and was then cooled to room temperature in a nitrogen atmosphere under pressure, thus forming a sintered body (cermet).
<Production of Samples 21 and 22>
The procedure for producing samples 21 and 22 is the same as the procedure for producing the samples 1 to 13 except the following points.
The average particle size of TiCN prepared as the first hard phase raw powder is 1.0 μm.
The ratio of raw powders (the ratio is listed in Table I)
The raw powders were mixed in the attritor at a peripheral speed of 200 m/min for a mixing time of 15 hours.

<Measurement of Characteristics of Samples>
The structure, composition, thermal conductivity, toughness, and hardness of the cermets of the samples 1 to 13, 21, and 22 were measured. Table I lists β/α of the structure (the definition of β/α is described below), the average particle size of the hard phase particles, thermal conductivity, toughness, and hardness, as well as the raw powder ratio.
<<Measurement of Structure and Composition of Hard Phase Particles>>
A cross section of a cermet of each sample was examined with a scanning electron microscopy-energy dispersive x-ray spectroscopy (SEM-EDX) apparatus. Observation of SEM photographs taken with the SEM-EDX apparatus showed that 70% or more of the hard phase particles in the visual field in all the samples had a cored structure that included a core and a peripheral portion around the core. FIG. 1 shows a SEM photograph of the cermet of the sample 1 as a representative. The black portions in the figure represent the cores of the hard phase particles having the cored structure. The gray portions represent the peripheral portions of the hard phase particles having the cored structure. The white portions represent binding phases. Particles having a black portion or a gray portion alone are hard phase particles having no cored structure.

The EDX measurement showed that the core of each hard phase particle having the cored structure was substantially composed of Ti carbonitride (and TiC in the sample 10), and the Ti content of the core was 50% or more by mass. The EDX measurement showed that the peripheral portion of each hard phase particle having the cored structure was composed of a solid solution of a carbonitride containing Ti (a Ti composite compound), and the W, Mo, Ta, Nb, and Cr content of the peripheral portion was 50% or more by mass.

The element contents of the cermet are identical with the element contents of the mixed raw materials. Thus, the Ti content of each sample ranges from 50% to 70% by mass, the W, Mo, Ta, Nb, and Cr content ranges from 15% to 35% by mass, and the Co and Ni content ranges from 15% to 20% by mass.

The average particle size α (μm) of the core and the average particle size β (μm) of the peripheral portion in each sample were measured in SEM images (×10000) with an image analyzing apparatus Mac-VIEW (manufactured by Mountech Co., Ltd.) (the average particle size of the peripheral portion is identical with the average particle size of hard phase particles having the cored structure). The average particle size of the hard phase particles having the cored structure was determined by measuring the Feret's diameter in the horizontal direction and the Feret's diameter in the vertical direction in 200 or more hard phase particles having the cored structure in each sample, calculating the respective average values, summing up the average values of the hard phase particles having the cored structure, and dividing the total by the number of measured particles. β/α, which is an indicator of the thinness of the peripheral portion in the hard phase particles, was then calculated. A large β/α indicates a relatively thick peripheral portion, and a small β/α indicates a relatively thin peripheral portion.

The core and the peripheral portion of the hard phase particles having the cored structure were distinguished by low-cut treatment in which the autoanalysis conditions of image analysis software were set as described below. Values in a low-cut color region indicate that the objective color is close to white or black. A smaller value indicates that the objective color is closer to black.

A portion having a value smaller than the low-cut specified value (a portion closer to black) is recognized as a particle.

Detection mode: color difference, margin of error: 32, scan density: 7, detection accuracy: 0.7
    Low-cut specified value in measurement of core: 50 to 100
    Low-cut specified value in measurement of peripheral portion: 150 to 200

The difference between the low-cut specified values of the core and the peripheral portion of the hard phase particles having the cored structure is fixed at 100.

The average particle size of hard phase particles (hard phase particle size in each table) was determined from the number of all the hard phase particles (200 or more) in the SEM image and the particle size of each hard phase particle. The particle size of each hard phase particle was determined with the image analyzing apparatus under the conditions described above.

<<Measurement of Thermal Conductivity>>

The thermal conductivity (W/m·K) of each sample was calculated by specific heat × thermal diffusivity × density. The specific heat and thermal diffusivity were measured by a laser flash method with TC-7000 manufactured by ULVAC-RIKO, Inc. The density was measured by an Archimedes' principle. The thermal conductivity can be calculated using the equation: heat penetration rate=(thermal conductivity× density×specific heat)$^{1/2}$. The heat penetration rate can be measured with a commercially available thermal microscope. The specific heat can be measured by differential scanning calorimetry (DSC).

<<Measurement of Toughness and Hardness>>

The toughness (MPa·m$^{1/2}$) and hardness (GPa) were determined according to JIS R1607 and JIS Z2244, respectively.

<<Summary of Measurement Results>>

The results in Table I show that the samples 1 to 13, in which the raw powder mixing time was 5 hours or less, had higher thermal conductivity and hardness than the samples 21 and 22, in which the raw powder mixing time was more than 10 hours. This is probably because the solid solution of the Ti composite compound constituting the peripheral portion had lower thermal conductivity and hardness than TiCN and TiC constituting the core. This is probably because the hard phase particles having the cored structure in the samples 1 to 13 had β/α in the range of 1.1 to 1.7, and the hard phase particles in the samples 21 and 22 had β/α of more than 2.0 (the peripheral portion of the hard phase particles having the cored structure in the samples 1 to 13 had a smaller thickness than that in the samples 21 and 22). Thus, a thick peripheral portion of the hard phase particles having the cored structure tends to result in low thermal conductivity and hardness of the cermet.

The results in Table I show that the samples 21 and 22 did not necessarily have lower toughness than the samples 1 to 13. This is probably because the solid solution of the Ti composite compound constituting the peripheral portion of the hard phase particles having the cored structure had high toughness.

TABLE I

| Sample No. | Percentage of raw powder (mass %) | | | | | | | | | β/α | Hard phase particle size (μm) | Thermal conductivity (W/m · K) | Toughness (MPa · m$^{1/2}$) | Hardness (GPa) |
| | TiCN | TiC | WC | Mo$_2$C | NbC | TaC | Cr$_3$C$_2$ | Co | Ni | | | | | |
|---|---|---|---|---|---|---|---|---|---|---|---|---|---|---|
| 1 | 64.1 | 0.0 | 19.2 | 0.0 | 0.0 | 0.0 | 0.0 | 16.7 | 0.0 | 1.4 | 0.7 | 25 | 6.6 | 14.4 |
| 2 | 68.0 | 0.0 | 16.2 | 0.0 | 0.0 | 0.0 | 0.0 | 15.8 | 0.0 | 1.3 | 0.7 | 24 | 5.1 | 15.5 |
| 3 | 59.3 | 0.0 | 24.0 | 0.0 | 0.0 | 0.0 | 0.0 | 16.7 | 0.0 | 1.3 | 0.8 | 27 | 6.8 | 14.0 |
| 4 | 64.1 | 0.0 | 19.2 | 0.0 | 0.0 | 0.0 | 0.0 | 8.4 | 8.3 | 1.5 | 0.6 | 22 | 5.7 | 15.2 |
| 5 | 68.0 | 0.0 | 16.2 | 0.0 | 0.0 | 0.0 | 0.0 | 7.9 | 7.9 | 1.5 | 0.7 | 21 | 4.8 | 16.3 |
| 6 | 62.2 | 0.0 | 14.9 | 7.6 | 0.0 | 0.0 | 0.0 | 7.7 | 7.6 | 1.6 | 0.6 | 19 | 5.1 | 15.7 |
| 7 | 62.1 | 0.0 | 19.2 | 0.0 | 0.0 | 0.0 | 2.0 | 16.7 | 0.0 | 1.5 | 0.6 | 22 | 4.8 | 15.4 |
| 8 | 59.1 | 0.0 | 19.2 | 0.0 | 0.0 | 0.0 | 5.0 | 16.7 | 0.0 | 1.5 | 0.6 | 22 | 4.4 | 15.6 |
| 9 | 56.7 | 0.0 | 19.2 | 7.4 | 0.0 | 0.0 | 0.0 | 16.7 | 0.0 | 1.6 | 0.6 | 22 | 4.8 | 15.7 |
| 10 | 60.7 | 6.2 | 16.8 | 0.0 | 0.0 | 0.0 | 0.0 | 8.2 | 8.1 | 1.5 | 0.9 | 22 | 6.2 | 14.7 |
| 11 | 61.5 | 0.0 | 19.2 | 0.0 | 2.2 | 0.0 | 0.0 | 8.6 | 8.5 | 1.6 | 0.9 | 21 | 6.1 | 14.2 |
| 12 | 61.5 | 0.0 | 19.2 | 0.0 | 0.0 | 2.2 | 0.0 | 8.6 | 8.5 | 1.6 | 1.0 | 21 | 6.2 | 14.3 |
| 13 | 64.1 | 0.0 | 19.2 | 0.0 | 0.0 | 0.0 | 0.0 | 8.4 | 8.3 | 1.5 | 1.1 | 24 | 7.0 | 14.0 |
| 21 | 54.1 | 9.7 | 13.8 | 7.4 | 0.0 | 0.0 | 0.0 | 10.1 | 4.9 | >2.0 | >2.0 | 15 | 5.5 | 12.7 |
| 22 | 66.9 | 0.0 | 16.8 | 0.0 | 0.0 | 0.0 | 0.0 | 8.2 | 8.1 | >2.0 | >2.0 | 14 | 4.8 | 12.5 |

<Cutting Test>

Cutting tools were then produced with part of the samples and were subjected to cutting tests. The cutting tests included a fracture resistance test, a wear resistance test, and a machined surface precision test.

The cermets of the samples 1, 4, 11, 13, and 22 were subjected to grinding (flat grinding) and then to cutting edge processing to produce a tip. The tip was fixed to an edge of a bit to produce a cutting tool. The cutting performance of the cutting tool was examined in turning under the conditions listed in Table II. Table III shows the results and the conditions of each sample listed in Table I. A fracture resistance test, a wear resistance test, and a machined surface precision test were performed. In the fracture resistance test, the time to fracture of the cutting edge of the tip was measured. In the wear resistance test, the flank wear of the tip was measured after cutting for 10 minutes. Both of the tests relate to the life of the tip. In the machined surface precision test, the center-line average roughness Ra of a machined surface was measured after cutting of a workpiece for 1 minute. Thus, the wear, microfracture, and adhesion resistance of the cutting edge of the tip were examined.

TABLE II

| | Fracture resistance test | Wear resistance test | Machined surface precision test |
|---|---|---|---|
| Workpiece | SCM435-V flute (Number of flutes: 4) | SCM435 (No flute) | STKM13A |
| Cutting speed Vc (m/min) | 280 | 270 | 100 |
| Feed per revolution f (mm/rev) | 0.2 | 0.2 | 0.15 |
| Depth of cut ap (mm) | 1.5 | 1.5 | 1.5 |
| Cutting environment | WET | WET | WET |
| Evaluation method | Time to fracture (min) | Flank wear after cutting for 10 min (mm) | Center-line average roughness Ra of machined surface of workpiece after cutting for 1 min (μm) |

TABLE III

| Sample No. | Hard phase particle size (μm) | Thermal conductivity (W/m · K) | Time to fracture (min) | Flank wear (mm) | Ra (μm) |
|---|---|---|---|---|---|
| 1 | 0.7 | 25 | 3.50 | 0.094 | 1.33 |
| 4 | 0.6 | 22 | 2.67 | 0.079 | 1.37 |
| 11 | 0.9 | 21 | 2.88 | 0.104 | 1.40 |
| 13 | 1.1 | 24 | 5.00 | 0.143 | 1.51 |
| 22 | >2.0 | 14 | 1.98 | 0.164 | 1.69 |

Table III shows that the cutting tools produced from the samples 1, 4, 11, and 13, which had a thinner peripheral portion of the hard phase particles having the cored structure than the sample 22, had high wear resistance and fracture resistance even in cutting by which the cutting edge was heated to high temperatures (cutting speed=100 m/min or more). The reason that the cutting tools produced from the samples 1, 4, 11, and 13 had good cutting performance is probably that the hard phase particles having the cored structure had high thermal conductivity due to the thin peripheral portion having low thermal conductivity. It is surmised that high thermal conductivity of the hard phase particles allows heat on the cutting edge generated by cutting to be easily dissipated and thereby reduces heat accumulation in the cutting edge and its vicinity. Comparing the samples 1, 4, 11, and 13, the flank wear decreases with decreasing average particle size of the hard phase particles. Thus, the wear resistance tends to be improved as the average particle size of the hard phase particles decreases. Likewise, comparing the sample 4 and the sample 11, which had a little difference in thermal conductivity, the sample 11, which had a greater average particle size of the hard phase particles, had a longer time to fracture. The sample 13, which had the greatest average particle size among the samples 1, 4, 11, and 13, had the highest fracture resistance. Thus, the fracture resistance tends to be improved as the average particle size of the hard phase particles increases. Comparing the sample 1 and the sample 11, the sample 1, which had a smaller average particle size of the hard phase particles, had a longer time to fracture and higher fracture resistance. This is probably because the sample 1 had much higher thermal conductivity than the sample 11.

TEST EXAMPLE 2

In Test Example 2, the effects of the mixing step on the structure of a cermet and cutting performance were examined.

First, cutting tools containing the cermets (the samples 14 to 16) were produced under the same conditions as for the sample 1 in Test Example 1 (the mixing ratio of the raw materials was also the same as in the sample 1) except the peripheral speed and mixing time of the attritor in the mixing step. The mixing conditions for the samples 14 to 16 were described below.

Sample 14: Peripheral speed of attritor=100 m/min, mixing time=0.1 hours

Sample 15: Peripheral speed of attritor=250 m/min, mixing time=5.0 hours

Sample 16: Peripheral speed of attritor=400 m/min, mixing time=5.0 hours

The "average particle size of hard phase particles", "β/α", "thermal conductivity", "toughness", and "hardness" of each sample were then measured in the same manner as Test Example 1. Table IV shows the results. Table IV also shows the results of the sample 1 of Test Example 1.

TABLE IV

| Sample No. | Peripheral speed (m/min) | Mixing time (h) | Hard phase particle size (μm) | β/α | Thermal conductivity (W/m · K) | Toughness (MPa · m$^{1/2}$) | Hardness (GPa) |
|---|---|---|---|---|---|---|---|
| 1 | 250.0 | 1.5 | 0.7 | 1.4 | 25 | 6.6 | 14.4 |
| 14 | 100.0 | 0.1 | 0.8 | 1.2 | 24 | 6.8 | 14.1 |
| 15 | 250.0 | 5.0 | 0.5 | 1.5 | 23 | 6.5 | 13.7 |
| 16 | 400.0 | 5.0 | 0.5 | 1.5 | 23 | 6.4 | 13.7 |

Table IV shows that β/α tends to be increased by increasing the peripheral speed of the attritor or the mixing time. In particular, it was found that when the peripheral speed of the attritor was approximately 250 m/min, and the mixing time was approximately 1.5 hours, cutting tools (cermets) could have a good balance of toughness and hardness and high thermal conductivity, which contributes to improved adhesion resistance.

INDUSTRIAL APPLICABILITY

A cermet according to the present invention can be suitably utilized as a substrate of cutting tools.

The invention claimed is:

1. A cermet comprising: hard phase particles containing Ti; and a binding phase containing at least one of Ni and Co, wherein 70% or more of the hard phase particles have a cored structure containing a core and a peripheral portion around the core, the core is composed mainly of at least one of Ti carbide, Ti nitride, and Ti carbonitride, the peripheral portion is composed mainly of a Ti composite compound containing Ti and at least one selected from W, Mo, Ta, Nb, and Cr, the core has an average particle size $\alpha$, the 70% or more of the hard phase particles have an average particle size $\beta$, and $\alpha$ and $\beta$ satisfy $1.1 \leq \beta/\alpha \leq 1.7$, and the hard phase particles in the cermet have an average particle size of 1.0 µm or less.

2. The cermet according to claim 1, wherein the cermet has a Ti content in the range of 50% to 70% by mass, a W, Mo, Ta, Nb, and Cr content in the range of 15% to 30% by mass, and a Co and Ni content in the range of 15% to 20% by mass.

3. A cutting tool, comprising the cermet according to claim 1 as a substrate.

4. The cutting tool according to claim 3, wherein at least part of a surface of the substrate is covered with a hard film.

5. The cermet according to claim 1, wherein the cermet has a thermal conductivity of 20 W/m·K or more.

6. A method for producing cermet, comprising:

a preparing step of preparing a first hard phase raw powder containing at least one of Ti carbide, Ti nitride, and Ti carbonitride, a second hard phase raw powder containing at least one selected from W, Mo, Ta, Nb, and Cr, and a binding phase raw powder containing at least one of Co and Ni, a mixing step of mixing the first hard phase raw powder, the second hard phase raw powder, and the binding phase raw powder in an attritor, a shaping step of shaping mixed raw materials prepared in the mixing step, and a sintering step of sintering a shaped body produced in the shaping step, wherein in the mixing step the attritor has a peripheral speed of 100 to 400 m/min, and the mixing time ranges from 0.1 to 5 hours.

* * * * *